No. 829,683. PATENTED AUG. 28, 1906.
B. TULKA.
HANDLE BAR FOR BICYCLES.
APPLICATION FILED JUNE 21, 1905.

WITNESSES.
Wm. D. Bell
Adele Gilatt

INVENTOR,
Bohumil Tulka
by Arthur Seward,
Attorney.

UNITED STATES PATENT OFFICE.

BOHUMIL TULKA, OF PRAGUE, AUSTRIA-HUNGARY.

HANDLE-BAR FOR BICYCLES.

No. 829,683.   Specification of Letters Patent.   Patented Aug. 28, 1906.

Application filed June 21, 1905. Serial No. 266,243.

*To all whom it may concern:*

Be it known that I, BOHUMIL TULKA, a subject of the Emperor of Austria-Hungary, residing at Prague, in the Kingdom of Bohemia, Austria-Hungary, have invented certain new and useful Improvements in the Mechanism of Handle-Bars for Bicycles and the Like, of which the following is a specification.

My invention relates to handle-bars for bicycles; and it consists in certain improvements in handle-bars of the detachable type whereby the mechanism is strengthened and the operation of attaching or detaching the handle-bars from the head or steering-spindle is greatly facilitated.

Figure 1:
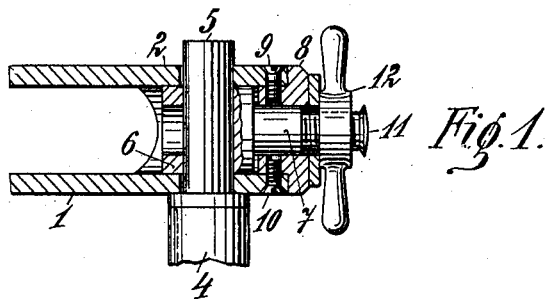
Figure 2:
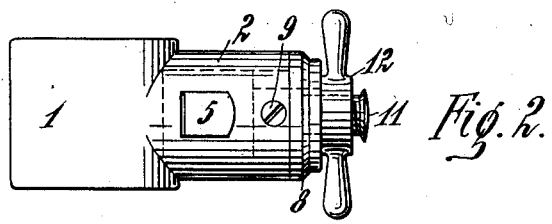
Figure 3:
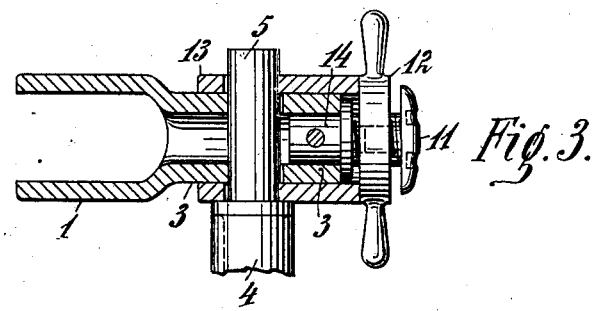

Referring to the accompanying drawings, Figure 1 is a view of the mechanism, showing certain parts in section. Fig. 2 is a plan view. Fig. 3 is a view similar to Fig. 1, but of a modified form of the invention; and Fig. 4 is a plan view of what is shown in Fig. 3.

In all the figures, 4 is the head of a bicycle or the like, and 5 a reduced extension or stud thereon, the latter having a non-circular cross-section.

Figure 4:
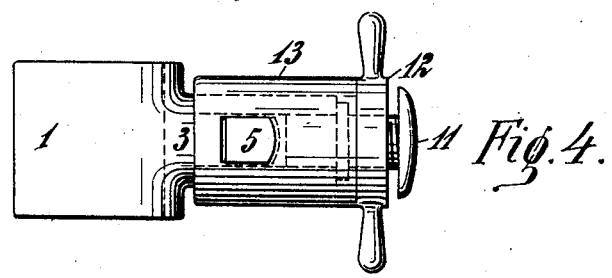

2 in Figs. 1 and 2, and 3 in Figs. 3 and 4, represent a tubular part formed with a fork 1, in which the handle-bars are secured, as by being welded thereto.

Referring now to Figs. 1 and 2, 6 is a tubular part sliding in the part 2, said parts 2 and 6 having transverse coinciding openings receiving the stud 5 and of substantially the same form, so that the parts cannot rotate on the stud. The part 6 is formed with the reduced threaded extension 7, which projects through the bushing 8, secured in the part 2 by screws 9. On the threaded extension 7 is a nut 12, which may bear against the bushing 8 and which is kept from running off the end of the extension 7 by the latter having its free end upset, as at 11.

In Figs. 3 and 4 the part 3 is arranged telescopically within a tubular part 13, said parts 3 and 13 having coinciding transverse openings receiving and formed to fit the stud 5. In the rear end of the part 3 is secured by a pin a threaded extension 14, on the threaded portion of which is a nut 12, which may bear against the end of the part 13. Upon manipulating the nut the parts 2 and 6 or 3 and 13 will be caused to move longitudinally, either acting to clamp themselves to the stud 5 or release the same, as will be obvious, according to the direction in which the nut is turned.

Having thus fully described my invention, what I claim as new, and desire to secure by Letters Patent, is—

In a bicycle handle-bar, the combination of the head, two cylindrical members arranged telescopically and having coinciding transverse openings receiving a portion of the head, one of said members having a reduced threaded extension, formed with a riveted head at its free end and a nut arranged on said threaded extension and adapted to abut against the other member, substantially as described.

In testimony whereof I affix my signature in presence of two witnesses.

BOHUMIL TULKA.

Witnesses:
ADOLPH FISCHER,
LADISLAV VOJACELZ.